C. D. Goodrich,
Oliver,
Nº 5,818.  Patented Oct. 3, 1848.
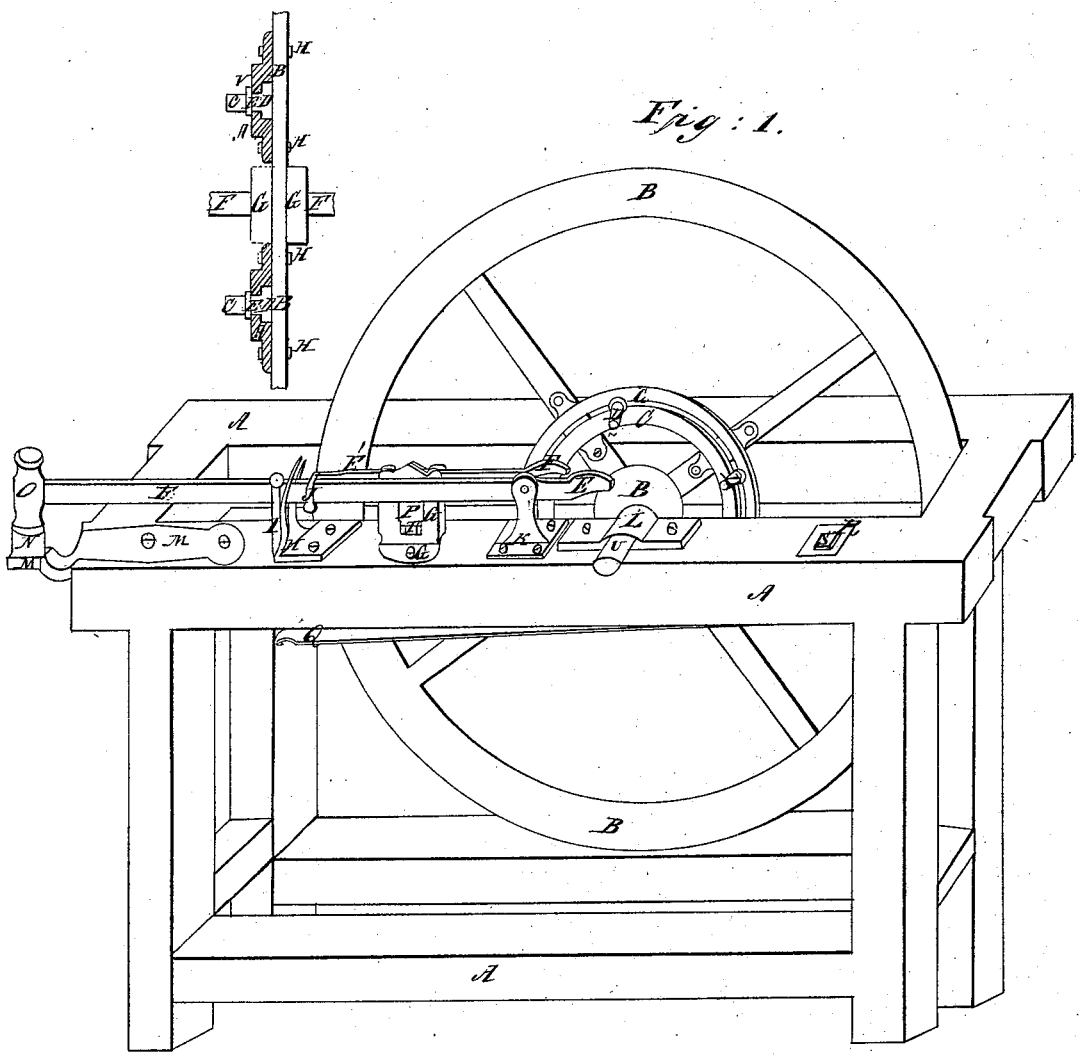

UNITED STATES PATENT OFFICE.

CORNELIUS D. GOODRICH, OF ANN ARBOR, MICHIGAN.

MACHINE FOR PLANISHING AND HAMMERING METAL.

Specification of Letters Patent No. 5,818, dated October 3, 1848.

*To all whom it may concern:*

Be it known that I, CORNELIUS D. GOODRICH, of the village of Ann Arbor, in the county of Washtenaw and State of Michigan, have invented a new and useful Machine for Hammering Metals, Planishing Copper, Tin, Brass, Silver, and Gold, and other purposes of Hammering, styled and known as "C. D. Goodrich's Hammering-Machine;" and I do hereby declare that the following is a full, clear, and exact description of the construction and operation of the same, reference being had to the annexed drawings, making a part of this specification, in which—

Figure 1 is a perspective view, and Fig. 2 a transverse section of the groove circle.

The nature of my invention consists of a machine furnished with a balance wheel to which is attached a groove circle near the center, into which are inserted any number of anti-friction rollers desirable; a lever with the segment of a circle or cam made on or attached to the end; which lever is attached or connected to a hammer. This lever is fastened or plays in a movable or sliding box inserted into the fulcrum of the lever; a spring connected with the hammer; a hammer and anvil. On causing the balance wheel to revolve, the anti friction rollers are made to pass over the segment of the circle or cam on the end of the lever depressing that end and elevating thereby the hammer which is made to give its blow by means of the spring. The force and weight of the blow are graduated by means of the sliding box, in which the lever or hammer as the case may be plays, since it is intended to work the machine with or without the side lever; placing the segment or cam for that purpose on the end of the hammer handle.

To enable others skilled in the art to make and use my invention, I will proceed to describe its construction and operation.

In the first place I construct my frame A (see annexed drawing) in the form of a parallelogram or any form that the circumstances of the case require; I then make my balance-wheel B in any of the usual forms of cast iron or any other material suitable. I make my grooved circle C in two parts of cast iron or any other metal with arms or fastenings on each to fasten or bolt them to the balance wheel. This grooved circle is furnished with two grooves (see Fig. 2). The lesser groove E is the one in which are inserted and move the wrists of the anti-friction rollers C (represented by D in Fig. 1,) on to this wrist is screwed the nut D, which fastens the roller C into the circle, and which nut plays or moves in the groove D. This latter or large groove D must be made sufficiently deep to permit the nut to pass by or over the arm of the balance wheel to which the circle is fastened (B in Fig. 2 represents the arm to which the circle is attached) in order that these anti friction rollers may easily be moved around the circle to admit the insertion of other rollers when the machine is required to give more blows in the same revolution. I make my antifriction rollers D (represented in Fig. 2 by C) of iron or steel, I first turn a bearing, on which I also turn a flange or shoulder sufficiently large not to admit it through the lesser groove in the circle. (See Fig. 2.)

On the opposite side of the bearing I turn the wrist E. I then make the roller C, (represented by D Fig. 1) and fasten it on the bearing with key or nut. I make my cam lever F (see Fig. 1) (I call it thus for brevity's sake) of iron or steel pretty near half the length of the hammer handle. On the end of this lever I make or attach the segment or cam F. This lever is connected to the hammer at J. It is the fulcrum at G. I make my fulcrum nearly in the shape of a parallelogram, or any other form, with an aperture of the same shape and of sufficient size to admit the sliding box P. I make my sliding or graduating box P, of solid iron or steel or brass with a groove in the top sufficiently wide and deep to admit the lever F, together with a screw T, in the bottom to raise and lower it.

I make my guide H, in any of the usual forms. I make my spring Q of one or any number of leaves according to the power required; it is made fast to the frame at S under the frame. This spring may be used directly under the hammer handle. It is connected to the hammer by means of a stirrup and connecting rod I. The stirrup is fastened by a bolt passing through the top of it and over the hammer handle. This bolt is let into the hammer handle half its thickness, to prevent it from shifting its place.

I make my hammer O, hammer handle E, whose fastenings are at K, anvil N and anvil block M in any shape or form that the business to which the machine is intended to be applied requires.

I arrange and combine the above different described parts in due and proper proportions as represented in Fig. 1, by causing the balance wheel to revolve the anti friction rollers are made to pass over the segment F, which depresses that end of the lever (which lever is connected to the arm of the hammer at J) and thereby elevating the hammer which is made to vibrate or give its blow by means of the spring Q and its own weight. The force of the blow is graduated by raising or lowering the movable box P, by means of the screw F.

What I claim as my invention and desire to secure by Letters Patent is—

The combination of the balance wheel B, groove circle C anti friction rollers D, segment or cam F, lever F', sliding or graduating box, P, and spring Q combined and arranged so as to produce a blow by the hammer O.

CORNELIUS D. GOODRICH.

In presence of—
N. M. SHOFF,
JAS. CUNNINGHAM.